Patented Jan. 7, 1941

2,227,485

UNITED STATES PATENT OFFICE 2,227,485

PURIFICATION OF "HEADS" ALCOHOL AND THE LIKE

Albert H. Bump, Watertown, Mass., assignor to Monsanto Chemical Company, St. Louis, Mo., a corporation of Delaware No Drawing. Application April 5, 1938
Serial No. 200,163

13 Claims. (Cl. 202—57).

The present invention relates to the art of purifying ethyl alcohol of hydrocarbon or molasses or grain origin, and it has particular relation to the refining of such alcohol for the purpose of eliminating foul-smelling compounds commonly associated with these products.

The present invention which is based upon the results of exhaustive observations enables one to eliminate impurities present in minute amounts, which impurities render the alcohol unfit for beverage and food stuff purposes. One object of the invention is to provide a commercially applicable method of treatment whereby alcohol, such, for example, as "heads" alcohol, may be converted into alcohol of extract or Cologne spirit quality.

Alcohol suitable for beverage and extract purposes must pass, among others, two important tests: one, the permanganate test; the other, the odor test. The odor test, which is extremely sensitive and at the same time very simple, involves diluting a sample of alcohol with an equal volume of warm, distilled water and observing the odor which is evolved. By this test, impurities which are present in otherwise undetectable amounts are readily found. The test is well known to those skilled in the art.

The permanganate test is a measure of reducing substances which are present as impurities in the alcohol. For the purpose of this test, fifty cubic centimeters of alcohol are placed in a clean two ounce wide mouth glass bottle provided with glass stopper. Two cubic centimeters of an aqueous solution of potassium permanganate are added with agitation to the alcohol. This permanganate solution is made from C. P. potassium permanganate and distilled water and is of a concentration equivalent to .2 gram of permanganate per liter. The stopper is inserted and the bottle is placed in an essentially light-proof compartment which in turn is supported in a water type thermostat designed to maintain temperature at 60° F. plus or minus .03° F. The bottle is removed and replaced quickly at intervals to note when the pink permanganate color has disappeared. Time is counted from the moment of mixing the permanganate solution and alcohol. When tested by this method the raw, untreated "heads" alcohol reacts with the permanganate within 20 to 30 seconds.

Pure ethyl alcohol, intended for beverage, fine medicinal and food uses is known as extract grade and rarely will such alcohol have a permanganate test of less than fifty minutes. More particular alcohol manufacturers strive to maintain their product with a permanganate test of about 55 minutes.

A great many proposals have been made heretofore with the view of improving the quality of "heads" alcohol. However, as far as I have been able to ascertain, neutral spirits, that is, alcohol of Cologne spirits or beverage quality is not and cannot be made by these various methods. While it is true that the various proposals do improve the quality of the alcohol to a certain extent, nevertheless, the improvement does not in any sense approximate the requirements of the odor and permanganate tests (referred to above) and in consequence thereof affords little, if any, marketing advantage over alcohol of denaturant quality.

The need for a satisfactory method of purification by which alcohol of beverage quality may be obtained can be understood by realizing that today the alcohol manufacturer is obliged to use a middle cut for his beverage alcohol and resort to other outlets for the initial and final cuts.

The dominating factor, without which a successful and economical purification process cannot be operated, is the necessity for effecting the purification while maintaining the alcohol in relatively concentrated form. The present invention not only enables one to obtain from "heads" alcohol a refined alcohol product which passes the beverage alcohol and extract alcohol specifications, but also can be and is applied effectively, without the necessity of dilution, to an alcohol that is of 180 proof or better concentration. The cost of one or more rectifying operations is accordingly obviated.

According to my invention, alcohol is subjected to the following sequence of steps:

(1) Treatment with a water-soluble permanganate or manganate under pH conditions ranging from 3–11, but preferably approximately 7.5.

(2) Physical separation of manganese dioxide as by filtration or distillation. For this purpose, it is sometimes desirable to neutralize the alcohol first, especially if the filtration of the alcohol is sluggish due to the physical form of the manganese dioxide. This removal of manganese dioxide is not absolutely essential, but affords markedly improved results. It is, therefore, definitely preferred.

Chemical removal as by means of reducing agents, for example, sodium bisulfite, is likewise effective, although I prefer this physical method.

(3) Digestion of the alcohol filtrate (or distillate, as the case may be) with a salt of an aromatic amine, the acid-forming group being an inorganic acid, including organic sulfonic acids.

(4) Distillation of the alcohol following the amine salt treatment, care being exercised to avoid entrainment.

(5) Digestion of alcohol distillate with caustic alkali preparatory for the final and sixth step.

(6) Distillation of the alcohol, again under conditions which avoid entrainment.

The following example illustrates an embodiment of my invention:

A charge of 2,450 cubic centimeters of "heads" alcohol (of grain or molasses origin) advantageously of at least 180 proof, is neutralized to a pH of 7.5. This usually requires the addition of alkali (preferably caustic alkali) because of the tendency of "heads" alcohol to be acidic. Generally, the amount of a base or alkali required does not exceed 2.0 grams of sodium hydroxide (dissolved in a minimum of water). Thereupon, after cooling the alcohol to approximately 14.5° C. a concentrated aqueous solution containing 4 grams of potassium permanganate is added, preferably while agitating the mixture. The temperature of the alcohol rises perceptibly (to about 15.5° C.), depending upon the heat transfer conditions, while the pink color of the permanganate gradually disappears. Usually this requires from 20 to 150 minutes at ordinary temperatures. At progressively higher temperatures which, incidentally, are progressively less desirable for my purpose, the reaction is more rapid. Under the conditions of my treatment, the action of permanganate is very selective toward certain impurities which are probably oxidized. A definite improvement in odor takes place during this step. On the other hand, certain new impurities are formed, for example, diethyl acetal, which must be removed in subsequent steps along with other reaction products of the permanganate treatment. The permanganate is reduced to manganese dioxide. The caustic probably reacts, at least in part, with organic acids formed during the treatment. The pH of the alcohol at this point will, however, be found to have increased to about 9.5, although this naturally depends to some extent upon the exact conditions, and the quantity and nature of the impurities present in the "heads" alcohol.

The manganese dioxide is then preferably separated from the alcohol, as by filtration. I have found that the addition of enough acid, say, for example, sulfuric or phosphoric, etc., to reduce the pH to about 7, facilitates the filtration although this is not essential. However, for this purpose about 0.5 gram of concentrated sulfuric acid will be found sufficient. Preferably, the acid is added in dilute form. A fine crystalline precipitate then usually appears, which forms a coagulum with the manganese dioxide that greatly improves the filtration properties of the latter. The crystalline material appears to consist essentially of sodium and potassium sulfates in the case of sulfuric acid.

After filtration, the alcohol is transferred into a three-liter flask equipped with a reflux condenser. To the alcohol there are added: 8.6 grams (5% excess) of 69% nitric acid followed by 8.2 grams of benzidine. Heat is then applied to provide a gentle reflux. During the reaction which follows, a color change from a greyish purple to a deep red will be observed. After 10 minutes to 1 hour, the alcohol mixture is distilled carefully, no substantial reflux being necessary, although care should be exercised to avoid entrainment. The first 2% of the distillate is quite strong in odor and discolors lead acetate paper, although no odor of hydrogen sulfide is perceptible. The next 10% of the distillate carries a perceptible ethyl acetate odor, even the subsequent distillate has a sweet odor reminiscent of esters. As the distillation proceeds, the charge in the flask becomes more and more saturated with benzidine-nitrate resinous by-products and other by-products. When about 70% of the alcohol is distilled, solids begin to separate from the solution. After about 87% of the alcohol is distilled, enough solids separate to cause bumping. To overcome this, one may, at this point, add about an equal volume, say, 250 cubic centimeters of water, and proceed with the distillation until the temperature of the charge reaches 98°–99° C. Only 0.25% or less of alcohol remains in the flask. The distillate, which is collected after the addition of water, and while the temperature rises from 79°–99° C., possesses a peculiar odor which is unlike the esters and which, together with the ester odor, must be and is removed in subsequent steps.

The total distillate thus obtained is transferred to a three-liter flask equipped with an efficient fractionating column. For this purpose I have used a 35 plate jack chain column. Twenty grams of solid sodium hydroxide are added to the charge, which is then digested for about an hour or longer, if necessary. During the digesting, and throughout subsequent distillation, the strongly alkaline alcohol remains substantially colorless. After the reaction with the caustic is complete, the alcohol is distilled while maintaining a reflux ratio of approximately 4 to 1. An 85% cut of the product so obtained meets all the specifications for Grade 1 beverage neutral spirits and reacts negatively to all U. S. P. X tests. Results of tests on cuts from the distillation are shown in the following table. A permanganate test of from 50 to 55 minutes is generally considered satisfactory. Sixty minutes or higher is exceptional.

| Cut | Percent based on original charge of "heads" alcohol | Permanganate test | Komarowsky reaction for fusel oil, acetal, etc. | Odor test | U. S. P. X test |
| --- | --- | --- | --- | --- | --- |
| | | Minutes | | | |
| 1 | 5 | 50 | Dark yellow-brown | Off. | |
| 2 | 2 | | Yellow (faintly brown) | Good. | |
| 3 | 85 | 67 | Lemon yellow | Neutral (no foreign odor). | Reacts negative to all tests. |
| 4 | 2 | | Yellow-brown to red | | |

The yield of "neutral spirits" is about 85%, based on the original charge of "heads" alcohol. The total yield is 95%. The initial and end fractions may be returned to the next batch which is to be treated, or it may be used in denatured formulae.

The quantity of permanganate is not limited to the amount specified; less can be used, especially when the alcohol has been held in vented storage tanks for several weeks or months prior to the purification treatment. More permanganate may be used, particularly at temperatures appreciably below atmospheric, if it is desired to hasten the oxidation reaction. Although a saturated aqueous solution of permanganate is recommended the solution need not be saturated. When it is important to maintain the proof or strength of the alcohol being treated or for any other purpose, the permanganate or its equivalent of a manganate may be added in the form of a finely ground solid. The time required for disappearance of the permanganate color with continued agitation of the solution will be about twice that required when using an aqueous solution of permanganate. Both methods of applying the oxidizing agent yield a product alcohol of excellent quality. Quantities of permanganate from .02% to 3.0% by weight on the alcohol being treated will generally result in satisfactory purification of the impure alcohols encountered in practice. Other permanganates than sodium and potassium may be used. Likewise, manganates (e. g., $K_2MnO_4$), either crude or pure, may be employed satisfactorily, particularly with freshly condensed "heads" alcohol which contains a relatively high proportion of dissolved carbondioxide. The carbondioxide converts the manganate to permanganate, the latter being the more powerful oxidizing agent.

During the treatment with permanganate or its equivalent, the malodorous impurities appear to be largely eliminated or converted to non-odorous products by a process of selective, restrictive oxidation. The permanganate is reduced to manganese dioxide.

The amine salt treatment which follows the removal of the precipitated manganese dioxide is best performed with salts of amines which are soluble in alcohol at elevated temperatures. Whereas some noticeable improvement is made possible with any amine salts, I have, in general, found that the alcohol-soluble salts are unexpectedly more effective and I use this test, therefore, in selecting salts. The acid may be selected from a very wide range. In addition to the nitric acid salt, I have tested and found, among others, the following to be suitable for my purpose: the halogen acids, especially HCl, in organic oxyacids, such as perchloric acid, hypophosphorus, sulfuric and phosphoric acid. Of these, inorganic oxy-acids, perchloric, hypophosphorous and nitric acid have been found to give salts which are among the most soluble and more rapid in their action than most inorganic acid-amine salts which I have tested.

From the point of view of plant-scale operations, such considerations as corrosion, volatility, etc., are important in addition to the inherent operativeness of the reagent itself. I have found that aromatic amines generally are operative, although certain materials are preferred for one reason or another over other materials. I have tested aniline, the toluidines, nitro-anilines and amino-phenols, all of which are effective. In general, the meta derivative is the most effective, the para next and the ortho least. Of the diamines, metaphenylenediamine is outstanding, paraphenylenediamine is mediocre, and orthophenylenediamine is even less effective. With 2,4-diaminophenol and metatoluenediamine, results nearly as good as with metaphenylenediamine or benzidine were obtained. In the polynuclear diamine class, benzidine, 2,4-diaminodiphenylamine and 2,4,2',4'-tetraaminodiphenyl all give quite satisfactory results. Combinations of mono and polyamines may be used. For example, I have used aniline and polyamines mentioned above, such as benzidine.

As mentioned above, the aromatic amines are generally effective, but, because of conditions such as volatility, toxicity, corrosion, etc., on the one hand, availability, speed and completion of reaction and a variety of other considerations, on the other, I prefer the nitric acid salt of the relatively less volatile amines, such as benzidine. In this connection, it can be observed that, while benzidine is somewhat toxic, it is safe to use. Tests on the final alcohol product for benzidine, which are sensitive to one part in 100 million, have uniformly given negative results. The quantity of active amine which is found to be effective varies from 0.5 to approximately 2% on the weight of the alcohol being treated.

I am aware that it has been proposed heretofore to purify alcohols by treatment with a large variety of reagents, and, as stated above, many of these treatments are partially effective; none of them have ever been proposed or used successfully, as far as I am aware, in the manufacture of neutral spirits. Moreover, it is a fact that the reagents used, as, for example, the permanganate, form products which are themselves objectionable, but, by observing the conditions and sequence of steps of my invention, it is possible for the first time, so far as I am aware, to produce neutral spirits from "heads" alcohol. This means that it is possible for the first time to obtain substantially all of the alcohol of a distillery in the form of neutral spirits.

The following schedule of results illustrates the effect of departing from the sequence of my invention:

| Sample | Permanganate test, quantity expressed in percent of originally charged "heads" alcohol | Komarowsky reaction for fusel oil, acetal, etc. | Odor test |
|---|---|---|---|
| A | First 10%, 8 seconds <br> Succeeding 70%, 1 minute | Brownish-black | Very bad in foreign odors. |
| B | First 10%, 1 minute <br> Succeeding 70%, 8 minutes | Dark brownish-red | Very bad in foreign odors, slightly better than "A." |
| C | First 10%, 12 minutes <br> Succeeding 70%, 34 minutes | Dark brownish-red | Very bad in foreign odors, as bad as "B." |
| D | First 10%, immediate <br> Succeeding 70%, immediate | Faintly brownish | Very bad in foreign odors, as bad as "A" and "B." |
| E | First 5% <br> Second 70%, 67 minutes | Lemon-yellow | Very bad in foreign odors, as bad as "A," "B," and "C." |
| F | First 5%, 26 minutes <br> Second 70%, 67 minutes | Dark brownish-red | Very bad in foreign odors. |
| G | First 5%, 50 minutes <br> Next 5%, 65 minutes <br> Next 70%, 67 minutes <br> Next 15%, 65 minutes | Yellow-brown <br> Lemon-yellow <br> ------do------ <br> ------do------ | Very slight foreign odor. <br> No foreign odor. <br> Do. <br> Do. |

Sample A was obtained by carefully distilling untreated "heads" alcohol through a 25 plate column.

Sample B was obtained by treating a neutralized sample of "heads" alcohol with permanganate and subsequently distilling the same while avoiding entrainment.

Sample C differed from sample B in that the material was subjected to a caustic treatment following the permanganate treatment.

Sample D was "heads" alcohol treated with benzodine nitrate and thereafter distilled.

Sample E was obtained by subjecting a part of sample D to a caustic treatment following a second careful distillation.

Sample F was "heads" alcohol treated with benzidine nitrate, after which it was distilled; subjected to the permanganate treatment; filtered to remove manganese dioxide; and, finally, digested with caustic alkali and distilled.

Sample G followed the procedure of the invention. Benzidine hydrochloride gave the same results in this process.

Unless otherwise indicated the fusel oil test and the odor test were applied to the cut representing the 70% fraction, following the first 10% fraction.

While in the foregoing process "batch" operations have been described, it is to be understood that the process may be conducted in a continuous or semi-continuous fashion, for example, the caustic treatment, as well as the amine treatment, may be performed conveniently, especially on a large scale, in a continuous fashion and at a considerable saving in cost.

The description of the foregoing process has been described as applying particularly to concentrated alcohol. It is to be understood that an alcohol of less than 180 proof may be treated successfully according to the present invention. However, certain very important economies are possible in commercial operation which could not otherwise be realized, due to the fact that alcohols of high strength may be processed successfully according to my invention.

The nitric acid salts have, in general, afforded outstanding results and these are preferred for commercial use because of the following advantages among others; cost, rate of reaction, completeness of reaction, relative freedom from corrosive characteristics, quality and yield of a final alcohol product, and general availability.

Although I have described in detail the preferred form of my invention and I have indicated certain variations which may be practiced, it is to be understood that some changes in the conditions expressly set forth may be employed to advantage, depending upon the type of raw material used and the nature of the impurities present, and that these changes may be made without departing from the spirit of my invention substantially as described and claimed herein.

What I claim is:

1. A process of obtaining neutral spirits of U. S. P. X quality from "heads" alcohol, characterized in that "heads" alcohol of a pH of 3 to 11 is subjected to mild oxidation with a water-soluble salt of manganic or permanganic acid, while avoiding temperatures substantially above 25° C., and subsequently subjecting the alcohol to the action of an inorganic acid salt of an aromatic amine, thereafter distilling the alcohol while avoiding entrainment, converting residual impurities into separable form by digesting the alcohol with caustic soda and, finally, distilling the digested alcohol while avoiding entrainment.

2. A process of obtaining neutral spirits of U. S. P. X quality from "heads" alcohol, characterized in that substantially neutral "heads" alcohol of not substantially less than 180 proof is subjected to mild oxidation with a water-soluble salt of manganic or permanganic acid, while avoiding temperatures substantially above 25° C., and subsequently subjecting the alcohol to the action of an inorganic acid salt of an aromatic amine, thereafter distilling the alcohol while avoiding entrainment, converting residual impurities into separable form by digesting the alcohol with caustic soda and, finally, distilling the digested alcohol while avoiding entrainment.

3. A process of obtaining neutral spirits of U. S. P. X quality from "heads" alcohol, characterized in that "heads" alcohol of a pH of 3 to 11 and of not substantially less than 180 proof is subjected to mild oxidation with a water-soluble salt of manganic or permanganic acid, while avoiding temperatures substantially above 25° C., and subsequently subjecting the alcohol to the action of an inorganic acid salt of an aromatic amine, thereafter distilling the alcohol while avoiding entrainment, converting residual impurities into separable form by digesting the alcohol with caustic soda and, finally, distilling the digested alcohol while avoiding entrainment.

4. A process of obtaining neutral spirits of U. S. P. X quality from "heads" alcohol, characterized in that "heads" alcohol of a pH of 3 to 11 is subjected to mild oxidation with a water-soluble salt of manganic or permanganic acid, while maintaining the temperature at about 12°–18° C., and subsequently subjecting the alcohol to the action of an inorganic acid salt of an aromatic amine, thereafter distilling the alcohol while avoiding entrainment, converting residual impurities into separable form by digesting the alcohol with caustic soda and, finally, distilling the digested alcohol while avoiding entrainment.

5. The method as defined in claim 1 and further characterized in that the manganese dioxide formed, as a result of the permanganate treatment, is first separated before the aromatic amine salt treatment.

6. The method as defined in claim 1 and further characterized in that the manganese dioxide formed as a result of the permanganate treatment is filtered from the alcohol after the pH of the alcohol is adjusted to approximately 7.0.

7. The treatment as defined in claim 1, the further improvement wherein an aromatic amine salt is selected which is soluble in hot alcohol.

8. The method according to claim 1 in which the acid radical of the amine salt is selected from the group consisting of inorganic halogen-acids and inorganic oxy-acids.

9. The process according to claim 1 in which benzidine nitrate is the aromatic amine salt.

10. The method as defined in claim 1 and further characterized in that a distillation immediately following the amine salt treatment is conducted, whereby approximately 80–90% of the alcohol is first distilled, after which there is added to the residual alcohol a quantity of water of substantially equal volume to said residual alcohol, and the distillation is thereafter continued.

11. The method according to claim 1 in which the final distillation is conducted whereby an initial fraction and end fraction, which combined are a relatively minor part of the total distillate, are collected separately from the intermediate major fraction.

12. The method of obtaining neutral spirits of U. S. P. X quality from "heads" alcohol of at least 180 proof, while avoiding substantial dilution of said alcohol, characterized in that the pH of the "heads" alcohol is adjusted to approximately 7.5 and thereupon is subjected to mild oxidation at a temperature of 14°–16° C. by means of a solution of a salt of permanganic acid to destroy oxidizable impurities, whereupon manganese dioxide is formed which is separated, after which the manganese dioxide free alcohol is reacted in the presence of an inorganic salt of an aromatic amine, which salt is soluble in hot alcohol, distilling the reacted mixture to recover the alcohol therefrom and thereafter digesting the distilled alcohol with caustic soda to render residual impurities separable by distillation, and, finally, distilling the alcohol under conditions whereby an initial and end fraction constituting a minor part of the total distillate are collected separately from the intermediate major fraction.

13. A process of obtaining neutral spirits of U. S. P. X quality from "heads" alcohol, characterized in that "heads" alcohol of a pH of 3 to 11 and of not substantially less than 180 proof is subjected to mild oxidation with a water-soluble salt of manganic or permanganic acid, while maintaining the temperature at about 12°–18° C., and subsequently subjecting the alcohol to the action of an inorganic acid salt of an aromatic amine, thereafter distilling the alcohol while avoiding entrainment, converting residual impurities into separable form by digesting the alcohol with caustic soda and, finally, distilling the digested alcohol while avoiding entrainment.

ALBERT H. BUMP.